(12) United States Patent
Kingsley

(10) Patent No.: US 6,961,377 B2
(45) Date of Patent: Nov. 1, 2005

(54) TRANSCODER SYSTEM FOR COMPRESSED DIGITAL VIDEO BITSTREAMS

(75) Inventor: Roger Kingsley, Jerusalem (IL)

(73) Assignee: Scopus Network Technologies Ltd., Rosh Haayin (IL)

( * ) Notice: Subject to any disclaimer, the term of this patent is extended or adjusted under 35 U.S.C. 154(b) by 256 days.

(21) Appl. No.: 10/281,278

(22) Filed: Oct. 28, 2002

(65) Prior Publication Data
US 2004/0081237 A1 Apr. 29, 2004

(51) Int. Cl.7 .............................................. H04N 7/12
(52) U.S. Cl. ................................................ 375/240.12
(58) Field of Search .......................... 348/14.01, 14.13; 386/109, 111, 112; 375/240.11–240.16, 240.24–240.26; 725/87; H04N 7/12

(56) References Cited

U.S. PATENT DOCUMENTS

| 6,526,099 B1 * | 2/2003 | Christopoulos et al. ............ 375/240.26 |
| 6,621,866 B1 * | 9/2003 | Florencio et al. ...... 375/240.25 |
| 2001/0047517 A1 * | 11/2001 | Christopoulos et al. ....... 725/87 |
| 2002/0131496 A1 * | 9/2002 | Vasudevan et al. .... 375/240.11 |
| 2002/0136298 A1 * | 9/2002 | Anantharamu et al. 375/240.12 |

* cited by examiner

*Primary Examiner*—Richard Lee
(74) *Attorney, Agent, or Firm*—Edward Lnager Pat Atty; Shibolth Yisraeli Roberts Zisman & Co.

(57) ABSTRACT

A transcoder system for compressed digital video bitstreams comprising three frame types: I-frames, P-frames and B-frames. The system includes a picture reader decoder to ascertain the type of each frame prior to transcoding. The system also includes a $T_2$ transcoder for processing I-frames and P-frames, possibly excepting the last P-frame of a group-of-frames (GOP), a $T_1$ transcoder for processing B-frames and (optionally) the last P-frame of a GOP and a picture decision block for separating all frames into I-frames and P-frames, possibly excepting the last P-frame of a GOP for processing by the $T_2$ transcoder and B-frames and (optionally) the last P-frame of a GOP for processing by said $T_1$ transcoder. Another component is a remerge block for recombining the output of all frames from said $T_1$ transcoder and the $T_2$ transcoder into a reconstituted output bitstream, such that most of the frames are processed by the much faster $T_1$ transcoder, thereby achieving substantial improvement in the transcoding throughput speed while retaining a low error rate.

11 Claims, 4 Drawing Sheets

TRANSCODER SYSTEM FOR COMPRESSED DIGITAL VIDEO BITSTREAMS

FIELD OF THE INVENTION

The present invention relates to systems for transcoding compressed digital video bitstreams. More particularly, the present invention relates to systems and methods, which enable the hybridization of multiple forms of transcoders for more efficient compression of digital video bitstreams.

BACKGROUND OF THE INVENTION

Digital video systems have received wide acceptance in the past decade. Digital Video Broadcasting (DVB), Digital Video Disc (DVD), Digital Video Recorders, Distant Learning, Video on Demand, and Videoconferencing are some typical examples. The key technology that enables these applications is digital video coding, which compresses video while keeping video quality satisfactory. For example, with digital video coding techniques, one current NTSC terrestrial analog TV channel can transmit four to six Standard Definition Television (SDTV) programs, each of which generally provides better video quality than the current analog NTSC TV, or it can supports the broadcasting of one High Definition Television (HDTV) program [1].

Currently, there are many video coding standards established for different video applications e.g., H.263 for low bitrate video applications such as video phone and videoconferencing, Motion Photographic Experts Group (MPEG)-2 for high bitrate high quality applications such as digital TV broadcasting and DVD, and MPEG-4 for streaming video applications. As the digital video applications become more and more popular, there will be increasing amount of video contents encoded with various standards. For many real-time applications there are often needs to dynamically convert the video between different formats. The operation of converting a video in compressed format into another video also in compressed format is called video transcoding. A device that performs video transcoding is called a video transcoder. For example, a digital video program may originally be compressed in MPEG-2 at 9 Mb/s and stored in the server. A program provider transmits this program through a satellite channel to a cable-headend. However due to limited cable capacity, the cable-headend has to relay this incoming video onto a cable channel at a lower bit-rate, say 5 Mbits/s, also in the compressed MPEG-2 form. To achieve this, the headend can perform transcoding on the input video to lower its bitrate so that the video bit-stream can be transmitted via the cable channel. In fact, besides bit-rate adaptation, a transcoder can dynamically change any coding parameters of compressed video, including frame-rate, spatial resolution, video content and/or coding standard used.

MPEG-2 is a sequence of images played by a video player. Transcoding is a technique to adapt the rate of compressed MPEG-2 video bitstreams to dynamically varying bit rate constraints. Transcoding can also be applied to MPEG-1, MPEG-4, h.261, h.263 and h.26L. Because video is a sequence of still computer images played one after another, the approach provides an interface, or filter, between the input encoded bitstream and the network, with which the transcoder's output can be perfectly matched to the network's quality of service (QOS) characteristics.

The use of digital transmission formats is proliferating fast. The connection of several transmission media may give rise to the following problem. Suppose a content provider transmits, e.g., across a satellite link. The transmission is a compressed digital video signal, and this program is to be relayed, e.g., on a cable network.

The relayed signal must also be in the compressed format. The bit-rate of the digital video signal on the satellite link is R1 (Mbits/s) and the cable network has a limited capacity, such that the incoming program can only be relayed if its bit-rate is R2 (Mbit/s) or less. The problem is that the incoming compressed signal at a given bit-rate has to be converted into a compressed signal of a lower bit-rate. The specific transcoding problem of bit-rate conversion is addressed hereinbelow.

FIG. 1, is a prior art schematic block diagram of a basic configuration of a system including a transcoder. Generalizing the case, rate shaping is defined as an operation which, given an input compressed video bitstream and a set of rate constraints, produces another compressed video bitstream that complies with these constraints. If the rate constraints are allowed to vary with time, the operation is called dynamic rate shaping. The rate shaping operation is depicted in FIG. 1. Note that no communication path exists from the rate shaper to the source of the input bitstream, which ensures that no access to the encoder is necessary.

For a transcoder that makes a bit rate change, there are several solutions. Table 1 shows the algorithmic tools for three transcoding algorithms of different levels of complexity, $T_1$, $T_2$ and $T_3$. These cases are covered by the generalized transcoder shown in FIG. 2.

TABLE I

| Algorithmic tools | $T_1$ | $T_2$ | $T_3$ |
|---|---|---|---|
| Q, VLD/VLC | ✓ | ✓ | ✓ |
| MCP, DCT/IDCT |  | ✓ | ✓ |
| Motion estimation |  |  | ✓ |

$T_1$ is the simplest transcoder. The direct cosine transform (DCT) coefficients of the input bitstream are variable length decoded (VLD), requantized ($Q_2$) and variable length coded (VLC). The info-bus is modified to reflect any change in the quantizer parameters that are signalled in the bit stream. Additionally, the drift corrector in FIG. 2 is not used, i.e., the Δ-signal is set to zero. However, the latter leads to an additional reconstruction error on decoding caused by a drift between the decoder's prediction signal and the prediction signal used in the input bitstream. Drift errors occur in P-frames and B-frames, and can accumulate in P-frames until the next I-frame is transcoded. Therefore, the temporal distance of I-frames has an important impact on the visibility of drift-related artifacts. Due to its low complexity, $T_1$ is a candidate for software-based implementation.

Drift can be completely avoided if the drift correction signal A is generated as shown in FIG. 3. FIG. 3 is a prior art drift corrector for $T_2$. In this case the final reconstruction error depends on the quantization noise only, although there is a potential for a build-up of errors according to the number of transcoding stages. Thus, $T_2$ is the natural choice for high-quality transcoding. However, there is a significant increase in complexity due to the direct cosine transform/ inverse direct cosine transform (DCT/DCT) and motion compensating prediction (MCP) operations required, and much more processing power and memory is required.

Inherent to $T_1$ and $T_2$ is that the picture type, the coding decisions and the motion vectors are not changed from one transcoding generation to another. Although this is suitable for many applications, some require the algorithm $T_3$, for example when an intra frame of a high bit rate needs to be transcoded to an inter frame of a lower bit rate. A frame is a single still image in a sequence of images that, when displayed in rapid succession, creates the illusion of motion. The more frames per second (fps), the smoother the motion appears.

Intra-frame compression is compression that reduces the amount of video information in each frame on a frame-by-frame basis. Inter-frame compression is a compression scheme, such as MPEG, that reduces the amount of video information by storing only the differences between a frame and those preceding it. An I-frame in inter-frame compression schemes is the key frame or reference video frame that acts as a point of comparison to P-frames and B-frames, and is not reconstructed from another frame. A B-frame is a highly compressed, bi-directional frame that records the change that occurred between the I-frame before and after it A P-frame is the predictive video frame that exhibits the change that occurred compared to the I-frame before it.

If motion vectors are not available in the previous generation, e.g., before compression or transcoding, and/or the prediction mode is changed, motion estimation has to be added. The corresponding elements in the info-bus are then changed accordingly in the drift corrector from one generation to another. The presence of quantization noise can impose additional problems for a motion estimator and existing methods that normally deal with original pictures may have to be reviewed.

Quantization and rate control are key elements for high-quality transcoding.

Therefore, there is a need for a device that overcomes the limitations of prior art transcoders and provides a method that solves the need for efficient compression of digital video bitstreams.

SUMMARY OF THE INVENTION

Accordingly, it is a principal object of the present invention to overcome the limitations of prior art transcoder devices and provide a method that solves the need for efficient compression of digital video bitstreams.

A transcoder system for compressed digital video bitstreams comprising the three frame types: I-frames, P-frames and B-frames, is disclosed. The system includes a picture reader decoder to ascertain the type of each frame prior to transcoding. The system also includes a $T_2$ transcoder for processing I-frames and P-frames, except possibly for the last P-frame of a group-of-frames (GOP), a $T_1$ transcoder for processing B-frames and (optionally) the last P-frame of a GOP and a picture decision block for separating all frames into I-frames and P-frames, except possibly for the last P-frame of a GOP for processing by the $T_2$ transcoder and B-frames and (optionally) the last P-frame of a GOP for processing by the $T_1$ transcoder. Another component is a remerge block for recombining the output of all frames from the $T_1$ transcoder and said $T_2$ transcoder into a reconstituted output bitstream, such that most of the frames are processed by the much faster $T_1$ transcoder, thereby achieving substantial improvement in the transcoding throughput speed.

The present invention is a new coding mode, intermediate between $T_1$ & $T_2$ type transcoders, which can be implemented in a transcoder, which supports both $T_1$ $_{and}$ $_{T2}$ type modes by the addition of a switching mechanism. In this new mode rate reduction is performed on I-frames and P-frames using the techniques of the $T_2$ circuit, but on B-frames using those of the $T_1$ circuit.

The memory requirements of this mode are similar to those for the full $T_2$, but since two-thirds of the frames (the B-frames) are processed using the much faster $T_1$ process, the overall efficiency is much faster than for full $T_2$ processing.

In terms of output quality, there will be errors in the B-frames, but since the I-frames and P-frames, which provide the reference frames, are fully drift-corrected, there will be no accumulation of drift errors, and the errors in the B-frames will be on average much smaller than in a pure $T_1$ implementation.

This mode then provides an intermediate mode which is much more efficient than full $T_2$, but without much more diminution in the output picture quality for a given bit-rate reduction.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which.

DETAILED DESCRIPTION OF THE PREFERRED EMBODIMENTS

Figure 1:
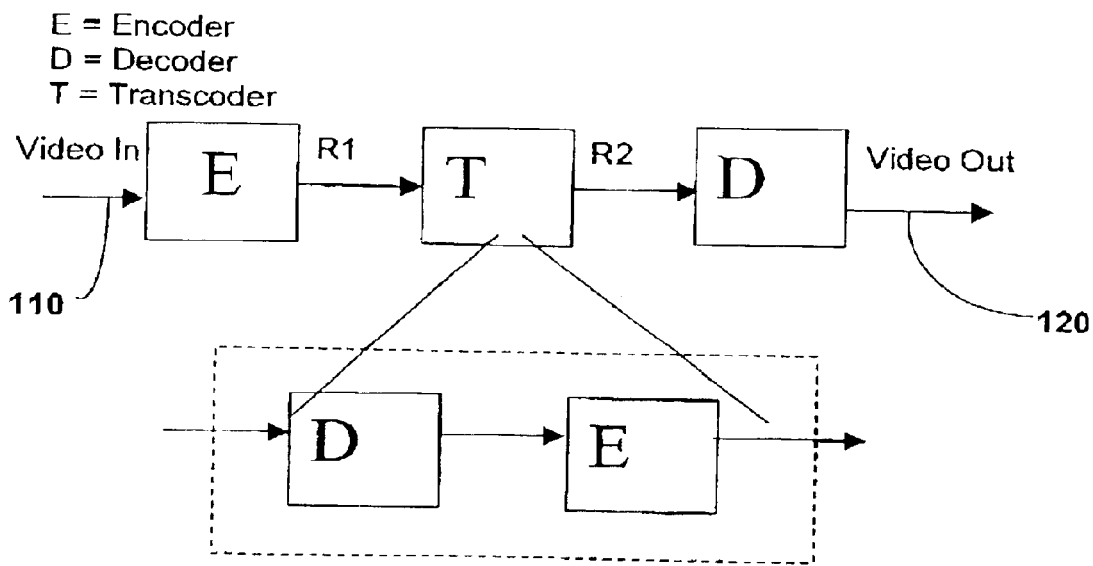
FIG. 1 is a prior art schematic block diagram of a basic configuration of a system including a transcoder.
Figure 2:
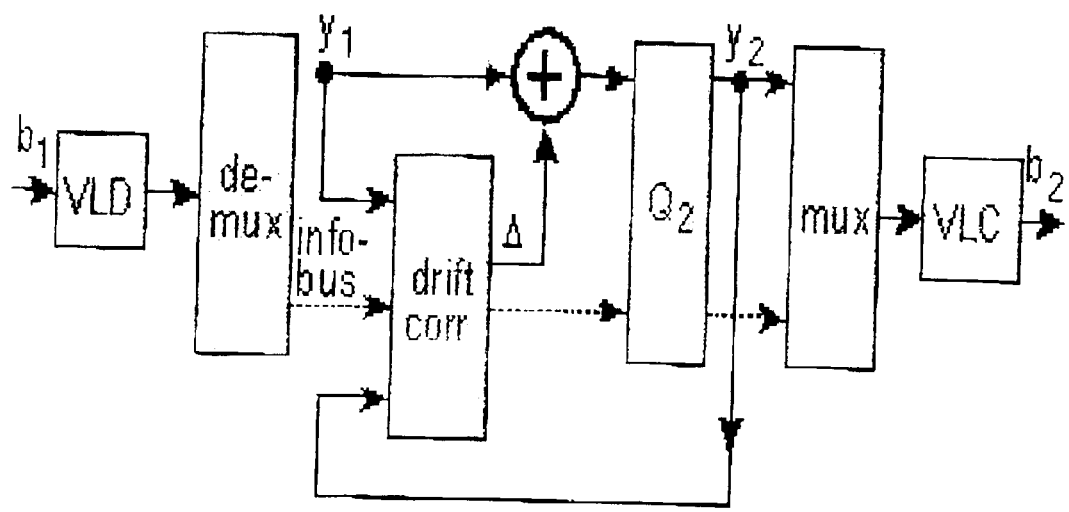
FIG. 2 is a generalized prior art transcoder.
Figure 3:
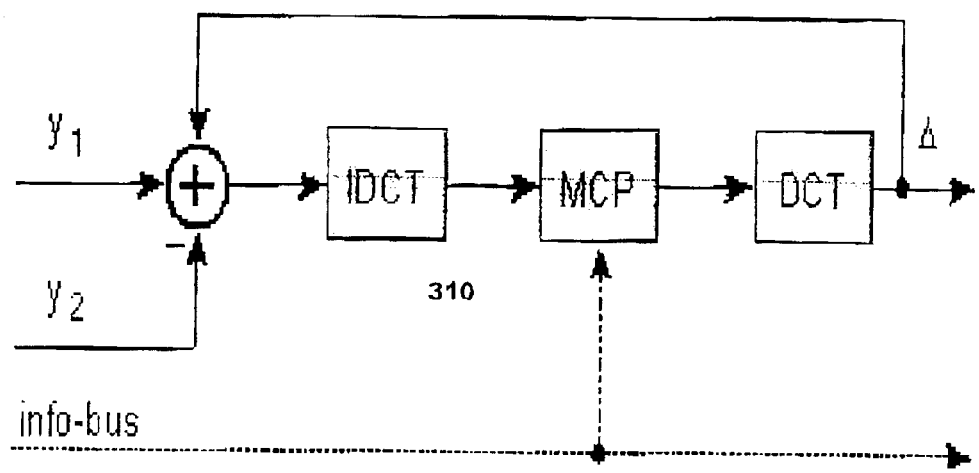
FIG. 3 is a prior art drift corrector for $T_2$.

Prior art FIGS. 1–3 showing earlier transcoder configurations have been described in the background.

Figure 4:
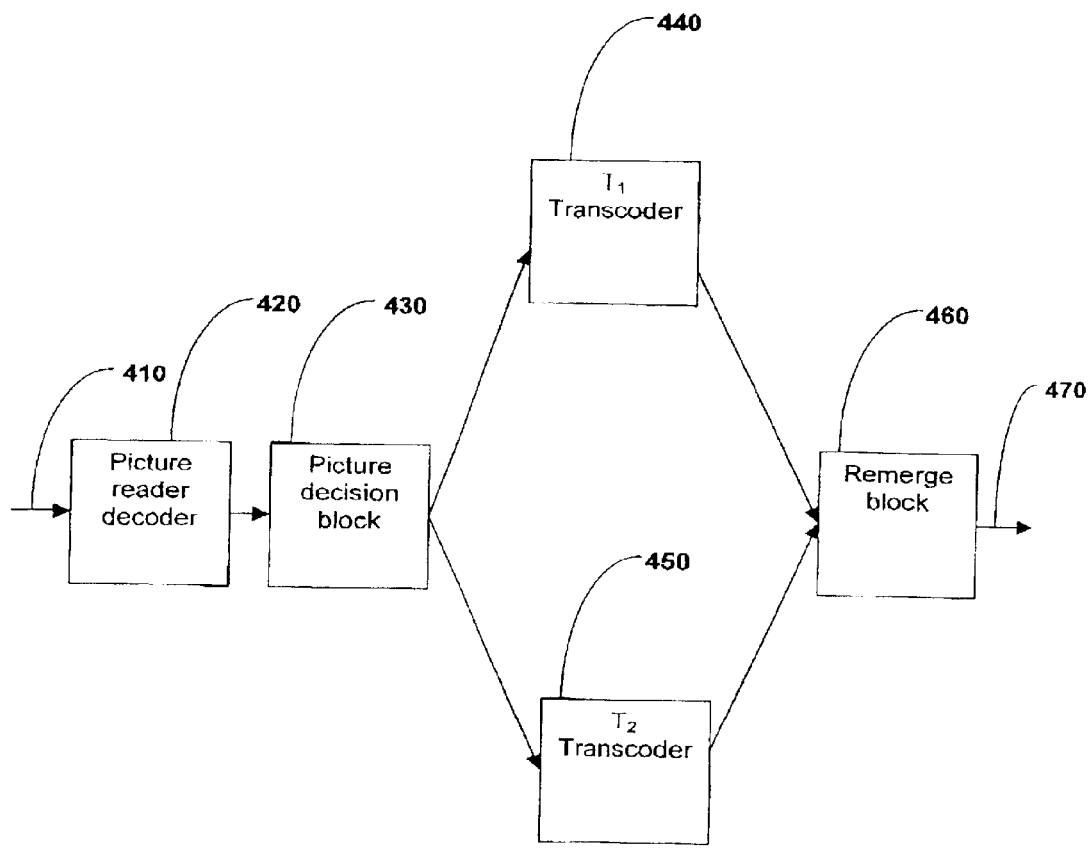
FIG. 4 is schematic block diagram of a switched transcoder, constructed in accordance with the principles of the present invention.

FIG. 4 is schematic block diagram of a switched transcoder, constructed in accordance with the principles of the present invention. The inventive coding mode is intermediate between $T_1$ & $T_2$ type transcoders, which can be implemented in a transcoder, which supports both $T_1$ and $T_2$ type modes by the addition of a switching mechanism incorporated in picture decision block 430. Rate reduction is generally performed on I-frames and P-frames, except possibly for the last P-frame of a group-of-pictures (GOP), using the $T_2$ transcoder; and on B-frames and the last P-frame of a GOP, using the $T_1$ transcoder.

In FIG. 4 there is shown an input bitstream 410 and an output bitstream 470. A picture reader decoder 420 reads input bitstream 410. Subsequently, the bitstream is processed by picture decision block 430, which decides on the frame type, and switches the bitstream accordingly. Rate reduction is performed on I-frames and P-frames, except the last P-frame of a GOP, using the $T_2$ transcoder 450, and on B-frames and the last P-frame of a GOP using the $T_1$ transcoder 440. The bitstreams from $T_1$ transcoder 440 and $T_2$ are then recombined in a remerge block 460.

The memory requirements of this mode are similar to those for the full $T_2$, but since two-thirds of the frames (the B-frames) are processed using the much faster $T_1$ process, the overall efficiency is much faster than for full $T_2$ processing.

In terms of output quality, there will be errors in the B-frames, but since the I-frames and P-frames, which provide the reference frames, are fully drift-corrected, there will be no accumulation of drift errors, and the errors in the B-frames will be on average much smaller than in a pure $T_1$ implementation.

The principle presented so far is to use $T_1$ transcoding for the B-frames, but to eliminate drift accumulation by using $T_2$ transcoding on the I-frames and on the P-frames, possibly excluding the last P-frames in the GOP. This is a special case of an alternative embodiment encompassing a more general strategy which would limit the accumulation of drift to a level consistent with the availability of computing resources by using $T_2$ transcoding on the I-frames and on the earlier P-frames, and switching to $T_1$ transcoding for the later P-frames of the GOP at a point consistent with the requirements for the limitation on the accumulation of drift and with the availability of computing resources.

These modes then provide intermediate modes which are much more efficient than full $T_2$, but without much diminution in the output picture quality for a given bit-rate reduction.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A transcoder system for achieving substantial improvement in the transcoding throughput speed of compressed digital video bitstreams comprising three frame types: I-frames P-frames and B-frames in a group-of-pictures/frames (GOP) progression, the system comprising:
   a picture reader decoder to ascertain the type of each frame prior to transcoding;
   a $T_1$ transcoder for processing B-frames and optionally the last P-frame of a GOP, at a first processing rate;
   a $T_2$ transcoder for processing I-frames and P-frames at a second processing rate, possibly excepting the last P-frame of a GOP;
   a picture decision block for separating all frames into;
      I-frames and P-frames, possibly excepting the last P-frame of a GOP for processing by said $T_2$ transcoder; and
      B-frames and optionally the last P-frame of a GOP for processing by said $T_1$ transcoder; and
   a remerge block for recombining the output of all frames from said $T_1$ transcoder and said $T_2$ transcoder into a reconstituted output bitstream,
   such that most of said output frames are processed by said $T_1$ transcoder, wherein said first processing rate of said $T_1$ transcoder is faster than said second processing rate of said $T_2$ transcoder thereby achieving substantial improvement in the transcoding throughput speed.

2. The system according to claim 1, wherein two-thirds of the frames are processed by the $T_1$ transcoder.

3. The system according to claim 1, wherein the application is for digital TV broadcasting.

4. The system according to claim 1, wherein the application is for Digital Video Disc (DVD).

5. The system according to claim 1, wherein the application is for videophone.

6. The system according to claim 1, wherein the application is for videoconferencing.

7. The system according to claim 1, wherein said $T_1$ transcoder dynamically transforms at least one the following coding parameters of compressed video:
   frame rate;
   spatial resolution;
   video contents; and
   coding standard.

8. The system according to claim 1, wherein said transcoder is used for universal media access by Internet users with different access links and devices.

9. The system according to claim 1, wherein said transcoder is used for universal media access by Intranet users with different access links and devices.

10. The system according to claim 1, wherein the P-frames are switched from said $T_2$ transcoder to said $T_1$ transcoder at some point in the GOP progression as a trade off between drift error limitation and CPU utilization, such that the later the switch, the smaller the accumulation of drift errors.

11. A method for achieving substantial improvement in the transcoding throughput speed of a transcoder system for compressed digital video bitstreams comprising three frame types: I-frames, P-frames and B-frames, said system comprising:
   a picture reader decoder to ascertain the type of each frame prior to transcoding;
   a $T_1$ transcoder for processing B-frames and optionally the last P-frame of a GOP, at a first processing rate;
   a $T_2$ transcoder for processing I-frames and P-frames at a second processing rate, possibly excepting the last P-frame of a group-of-frames (GOP);
   a picture decision block for separating all frames into;
      I-frames and P-frames, possibly excepting the last P-frame of a GOP for processing by said $T_2$ transcoder; and
      B-frames and optionally the last P-frame of a GOP for processing by said $T_1$ transcoder; and
   a remerge block for recombining the output of all frames from said $T_1$ transcoder and said $T_2$ transcoder into a reconstituted output bitstream,
   such that most of said output frames are processed by said $T_1$ transcoder, wherein said first processing rate of said $T_1$ transcoder is faster than said second processing rate of said $T_2$ transcoder, thereby achieving substantial improvement in the transcoding throughput speed, said method comprising the steps of:
      decoding to ascertain the type of each frame prior to transcoding;
      separating all frames into:
         I-frames and P-frames, possibly excepting the last P-frame of a GOP for processing by said $T_2$ transcoder; and
         B-frames and optionally the last P-frame of a GOP for processing by said $T_1$ transcoder; and recombining the output of all frames from said $T_1$ transcoder and said $T_2$ transcoder into a reconstituted output bitstream.

* * * * *